United States Patent
Zedlewski et al.

(10) Patent No.: US 7,707,578 B1
(45) Date of Patent: Apr. 27, 2010

(54) MECHANISM FOR SCHEDULING EXECUTION OF THREADS FOR FAIR RESOURCE ALLOCATION IN A MULTI-THREADED AND/OR MULTI-CORE PROCESSING SYSTEM

(75) Inventors: John R. Zedlewski, San Francisco, CA (US); Carl A. Waldspurger, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 1448 days.

(21) Appl. No.: 11/015,506

(22) Filed: Dec. 16, 2004

(51) Int. Cl.
*G06F 9/46* (2006.01)
*G06F 9/40* (2006.01)
*G06F 9/44* (2006.01)

(52) U.S. Cl. .................. 718/102; 718/104; 718/106; 712/215; 712/216; 712/226

(58) Field of Classification Search ......... 718/100–108; 709/100–200; 712/215, 216, 226
See application file for complete search history.

(56) References Cited

U.S. PATENT DOCUMENTS

| | | | | |
|---|---|---|---|---|
| 5,115,505 | A * | 5/1992 | Bishop et al. ............... | 718/104 |
| 5,872,972 | A * | 2/1999 | Boland et al. ............... | 718/102 |
| 6,269,391 | B1 * | 7/2001 | Gillespie .................... | 718/100 |
| 6,549,930 | B1 * | 4/2003 | Chrysos et al. ............ | 718/104 |
| 6,633,897 | B1 * | 10/2003 | Browning et al. .......... | 718/103 |
| 6,745,222 | B1 * | 6/2004 | Jones et al. ................. | 718/107 |
| 6,785,803 | B1 * | 8/2004 | Merchant et al. ........... | 712/219 |
| 6,996,822 | B1 * | 2/2006 | Willen et al. ................ | 718/102 |
| 7,290,259 | B2 * | 10/2007 | Tanaka et al. .................. | 718/1 |
| 7,412,492 | B1 * | 8/2008 | Waldspurger ............... | 709/216 |
| 2004/0054999 | A1 * | 3/2004 | Willen et al. ................ | 718/103 |
| 2006/0136915 | A1 * | 6/2006 | Aingaran et al. ........... | 718/100 |
| 2006/0136919 | A1 * | 6/2006 | Aingaran et al. ........... | 718/100 |
| 2006/0179289 | A1 * | 8/2006 | Floyd et al. .................. | 712/227 |
| 2006/0218556 | A1 * | 9/2006 | Nemirovsky et al. ........ | 718/104 |
| 2008/0134185 | A1 * | 6/2008 | Fedorova .................... | 718/102 |
| 2008/0215861 | A1 * | 9/2008 | Aamodt et al. .............. | 712/226 |

OTHER PUBLICATIONS

Dirk Grunwald and Soraya Ghiasi, "Microarchitectural denial of service: insuring microarchitectural fairness," International Symposium on Microarchitecture, Proceedings of the 35th annual ACM/IEEE International Symposium on Microarchitecture, Istanbul, Turkey, pp. 409-418, 2002.

(Continued)

*Primary Examiner*—Meng-Ai An
*Assistant Examiner*—Jennifer N To
(74) *Attorney, Agent, or Firm*—Jeffrey Pearce

(57) ABSTRACT

A thread scheduling mechanism is provided that flexibly enforces performance isolation of multiple threads to alleviate the effect of anti-cooperative execution behavior with respect to a shared resource, for example, hoarding a cache or pipeline, using the hardware capabilities of simultaneous multi-threaded (SMT) or multi-core processors. Given a plurality of threads running on at least two processors in at least one functional processor group, the occurrence of a rescheduling condition indicating anti-cooperative execution behavior is sensed, and, if present, at least one of the threads is rescheduled such that the first and second threads no longer execute in the same functional processor group at the same time.

33 Claims, 4 Drawing Sheets

OTHER PUBLICATIONS

Allan Snavely and Dean M. Tullsen, "Symbiotic jobscheduling for a simultaneous multithreaded processor," ACM SIGOPS Operating Systems Review, v.34 n.5, p. 234-244, Dec. 2000.

Allan Snavely, Dean M. Tullsen and Geoff Voelker in "Symbiotic jobscheduling with priorities for a simultaneous multithreading processor," ACM SIGMETRICS Performance Evaluation Review, v.30 n.1, Jun. 2002.

* cited by examiner

MECHANISM FOR SCHEDULING EXECUTION OF THREADS FOR FAIR RESOURCE ALLOCATION IN A MULTI-THREADED AND/OR MULTI-CORE PROCESSING SYSTEM

BACKGROUND OF THE INVENTION

1. Field of the Invention

This invention relates to schedulers as found in modern operating systems and in particular to a scheduler for use in a computer system with a multi-threaded and/or multi-core architecture.

2. Background Art

As is well known, modern computer systems consist of one or more central processing units (CPUs), as well as supporting hardware such as memory and memory management units (MMU) for each CPU, as well as less essential peripheral hardware such as I/O devices like network interfaces, disks, printers, etc. Software is also part of a computer system; typically, a software application provides the ultimate utility of the computer system for users.

Users often want to use more than one of these software applications, perhaps concurrently. To make this possible, software applications are typically written to run on top of a more privileged piece of software, often known as the "operating system" (OS), which resides, logically, as or in an intermediate software layer, between the applications and the underlying hardware. The OS uses a more privileged mode of the CPU(s), so that it can perform operations which software applications cannot. One of the main jobs of the OS is to coordinate the access by the various applications to shared system resources.

Scheduler

Given multiple applications that are to share some system resource, such as CPU or I/O access, some mechanism must exist to coordinate the sharing. In modern OSs, this mechanism is usually called a "scheduler," which is a program that coordinates the use of shared resources according to certain rules programmed into the scheduler by the designer.

The most fundamental shared resource is access to the CPU(s), since such access is required for execution of any code. Almost all modern operating systems export some notion of "task" or "process," which is an abstraction of a CPU and memory. A task is conceptually similar to an execution vehicle, and typically corresponds to a single logical activity that requires computational resources (memory, CPU, and I/O devices) to make forward progress. The operating system multiplexes these tasks onto the physical CPUs and other physical resources of the system.

Each task usually comprises one or more execution abstractions known as "threads." A thread typically includes its own instruction pointer and sometimes has its own stack. Typically, access to a CPU is scheduled per-thread. A task is thus an environment in which one or several threads are scheduled independently to run on the CPU(s), and not necessarily all (or even more than one) at a time even in multi-processor architectures.

A standing goal of all computer design—of both hardware such as CPUs and software such as OSs—is to enable applications to run as fast and as efficiently possible, even when sharing system resources, including the CPU(s). One way to accomplish this is of course though the design of the applications themselves. Another way is through efficient design of the OS, which usually entails computing an efficient schedule for executing threads. A specific scheduling problem is discussed below, but before this it is helpful also to consider some of the different hardware techniques that are being employed to increase overall execution speed, since these hardware choices also impact the problem of scheduling.

Multiprocessor Architectures

Most personal computer systems are equipped with a single CPU. Because CPUs today are quite fast, a single CPU often provides enough computational power to handle several "concurrent" execution threads by rapidly switching from thread to thread, or even task to task (a procedure sometimes known as time-slicing or multiprogramming). This management of concurrent threads is one of the main responsibilities of almost all operating systems.

The use of multiple concurrent threads often allows an overall increase in the utilization of the hardware resources. The reason is that while one thread is waiting for input or output to happen, the CPU may execute other "ready" threads. However, as the number of threads, or the workload within each thread, increases, the point may be reached where computational cycles, i.e., CPU power, is the limiting factor. The exact point where this happens depends on the particular workloads.

To permit computer systems to scale to larger numbers of concurrent threads, systems with multiple CPUs have been developed. These symmetric multi-processor (SMP) systems are available as extensions of the PC platform and from other vendors. Essentially, an SMP system is a hardware platform that connects multiple processors to a shared main memory and shared I/O devices. In addition, each processor may have private cache memory. The OS, which is aware of the multiple processors, allows truly concurrent execution of multiple threads, typically using time-slicing only when the number of ready threads exceeds the number of CPUs.

Multi-Core Architectures

Because of advances in manufacturing processes, the density of semiconductor elements per chip has now grown so great that "multi-core" architectures have been made possible; examples include the IBM POWER4 and POWER5 architectures, as well as the Sun UltraSparc IV. In these devices, more than one (at present, two, although this is a currently practical rather than a theoretical limitation) physical CPU is fabricated on a single chip. Although each CPU can execute threads independently, the CPUs share at least some cache and in some cases even other resources. Each CPU is provided with its own set of functional units, however, such as its own floating-point and arithmetic/logic units (ALU). Essentially, a multi-core architecture is a multi-processor on a single chip, although with limited resource sharing. Of course, the OS in such a system will be designed to schedule thread execution on one of the multi-core CPUs.

Simultaneous Multi-Threaded (SMT) Architectures

Still another modern technique that provides for simultaneous execution of multiple threads is referred to as "simultaneous multi-threading," in which more than one logical processor (hardware thread) operates simultaneously on a single chip, but in which the logical processors must flexibly share not only one or more caches (for example, for data, instructions and traces), but also functional units such as the floating-point unit and the ALU, as well as the translation lookaside buffer (TLB), if the TLB is shared.

As one example of an SMT architecture, Intel Corporation has developed its "Hyper-Threading Technology" to improve the performance of its Pentium IV and Xeon processor lines. In Intel's terminology, the single chip is referred to as a "package." While multi-threading does not provide the performance of a true multi-processor or multi-core system, it can improve the utilization of on-chip resources, leading to greater throughput for several important workload types, by exploiting additional instruction-level parallelism that is exposed by executing the instruction streams associated with multiple threads concurrently.

To understand the performance implications of simultaneous multi-threading, it is important to understand that most internal processor resources are shared between the two executing threads. For instance, in the Intel architecture, the L1, L2 and L3 caches and all functional units (such as the floating point units and arithmetic/logical units) are flexibly shared between the two threads. If one thread is using very little cache, then the other thread will be able to take advantage of all the unused cache space. However, if both threads demand large amounts of cache, they will compete for the limited capacity and likely slow each other down.

In an SMT system, the OS designates which software threads the logical processor(s) are to execute, and can also issue commands to cause an idle logical processor to be put in a halt state, such that its execution resources are made available for use by any remaining logical processors. Once threads are scheduled for execution on a multi-threaded hardware processor, internal mechanisms of the processor control use of the shared resources by the executing threads. At any time, the operating system can preempt a thread, that is, force it to give up the CPU on which it is running, in order to run another thread (perhaps one that has not run for some time, or one that the user has given a higher priority to). Putting a processor into the halt state typically involves preempting the running thread and instead scheduling on that processor a dedicated idle thread. This idle thread may use a processor-specific method to make the execution resources from the hardware context available to other threads in the same functional processor group. For instance, on the Intel IA-32 architecture, the idle thread may issue the "HLT" instruction.

Because at least one resource is shared between the logical processors of a multi-threaded system, the problem can arise that one thread might be "anti-cooperative," meaning that it does not conform to a predetermined notion of "fairness." Examples of anti-competitive execution behavior include using so much of or otherwise "hoarding" the shared resource or causing some other state change in the resource, such that a co-executing thread cannot execute as efficiently as it would if it had exclusive or at least "normal" use of the resource, or such that hardware or software intervention is required. In extreme cases, one thread could theoretically even completely prevent another thread from making forward execution progress, that is, "starving" it, for lack of the shared resource.

One example of this problem is described by Dirk Grunwald and Soraya Ghiasi in "Microarchitectural denial of service: insuring microarchitectural fairness," International Symposium on Microarchitecture, Proceedings of the 35th annual ACM/IEEE International Symposium on Microarchitecture, Istanbul, Turkey, pp. 409-18, 2002. Although most anti-cooperative applications in the specific SMT architecture they studied caused performance degradations of less than five percent, Grunwald and Ghiasi showed that a malicious application could degrade the performance of another workload running on the same physical package by as much as 90% through, for example, the use of self-modifying code in a tight loop.

Existing OS schedulers are not designed to cope with such problems as a microarchitectural denial of service conflict (or outright attack); rather, known schedulers may adjust the amount of execution time allocated to each of a set of runnable threads, but this ignores that the allotted execution time of a given thread may be wasted because of the actions of a co-executing, anti-cooperative thread. For example, as Grunwald points out, self-modifying code can lead to frequent complete flushes of a shared trace cache, which means that the cached information of the other running thread will also be lost, such that many processing cycles are needed to build it back up again, over and over. Even though the "nice" thread will have its allotted execution time, it will not be able to use it efficiently and the OS scheduler will not be able to do anything to improve the situation, assuming that the scheduler detects the situation at all.

Grunwald offers four possible solutions to the problem microarchitectural denial of service. First, Grunwald detects the need for intervention using various mechanisms such as performance counters, computing a function of committed instructions, and monitoring bad events such as cache and pipeline flushes. Then he applies one of four proposed "punition" mechanisms, all of which involve either stalling or suspending offending threads, or specifically modifying the OS kernel so that it changes the scheduling interval of an attacking thread. Even Grunwald acknowledges the inadequacy of his proposed software solutions, however, stating that "we think it is better to implement them in microarchitecture" in order to provide "compatibility across a number of operating systems, eliminating processor-specific features."

In general, to the small extent that system designers have recognized and addressed the problem of anti-cooperative processes in multi-threaded environments at all, the solutions have focused either on hardware support, or on ways for the OS scheduler to detect anti-cooperativeness and to adjust the execution time slice given to currently offending processes. One solution proposed by Allan Snavely and Dean M. Tullsen in "Symbiotic jobscheduling for a simultaneous multi-threaded processor," ACM SIGOPS Operating Systems Review, v. 34 n. 5, p. 234-244, December 2000, involves an "SOS" (Sample, Optimize, Symbios) scheduler that samples the space of possible schedules, examines performance counters and applies heuristics to guess an optimal schedule, then runs the presumed optimal schedule.

In a refinement, described by Allan Snavely, Dean M. Tullsen and Geoff Voelker in "Symbiotic jobscheduling with priorities for a simultaneous multithreading processor," ACM SIGMETRICS Performance Evaluation Review, v. 30 n. 1, June 2002, Snavely et al. incorporate the notion of priorities into the scheduling decisions, such that if a particular thread has a high enough priority, then idle threads are scheduled to run alongside it in the same package so that it is guaranteed enough CPU time.

One problem with both of Snavely's approaches are the Sample and Optimize phases, during which the processors are devoted to test cases. Only in a later phase are threads actually allowed to run so as to do the work they are intended to do. Because Snavely's method is two-pass, it is not suitable for run-time detection and alleviation of anti-cooperative behavior at actual run time.

Yet another disadvantage of Snavely's approaches is that his systems do not directly attempt to determine anti-competitive behavior. Because of this, threads that, during the Sample and Optimize phases, appeared to run well together, may not when actually running under normal conditions. In other words, Snavely assumes that threads will cooperate as well during actual "working" execution as they did during the Sample phase, but this assumption may not be correct—Snavely cannot detect and deal with previously undetected, run-time anti-cooperativeness.

Snavely's scheduler attempts to optimize how much CPU time each thread will get. In the presence of run-time anti-cooperative execution behavior, however, merely allocating more CPU time to a thread does not ensure optimal execution progress. As Grunwald points out, however, even very small thread segments (with self-modifying code, for example) can cause severe performance degradation of another running thread, such that merely reducing allocated time may not eliminate the problem: For example, a processor may have 90% of the total CPU time, but the 10% used by another, coscheduled and highly anti-cooperative thread might cause much of the other processor's 90% to be wasted recovering from the resource hoarding of the anti-cooperative thread. Merely adjusting the amount of time allocated to a given thread therefore ignores the unique features of the SMT architecture, in particular, the presence of more than one logical processor, and simply applies a solution that is also applicable to standard, single-processor systems.

Conversely, an anti-cooperative process is not necessarily malicious and may in fact be one that the user wants to have run quickly, perhaps even with a higher priority than other runnable threads. For example, a user may suppose that a particular important process contains self-modifying code in a tight loop, or has in the past caused problems for co-scheduled threads in an SMT architecture. Stalling or suspending this thread would therefore benefit other threads, but would lead to a worse result from the user's perspective.

Proposed mechanisms for dealing with the problem of shared resource hoarding in multi-threaded architectures fail to provide the user with any ability to influence how the OS addresses the problem. It would thus be beneficial to enable the user to control at least some of the decision about what to do in the presence of an anti-cooperative process in a multi-threaded architecture.

What is needed is a mechanism that more efficiently addresses the problem of anti-cooperative and malicious threads in multi-threaded processor architectures, and that preferably does so with no need for hardware support other than that already provided by the multi-threaded processor. Optionally, it would also be beneficial to give the user at least some control over the mechanism.

SUMMARY OF THE INVENTION

The invention provides a method and corresponding system implementation for controlling execution of a plurality of threads by a processing system that has at least two processors in at least one functional processor group, in which threads coscheduled for execution on the processors share an internal processor group resource. When at least a first and a second thread are coscheduled for execution on the processors of the functional processor group, the invention senses, during run time, the presence of a rescheduling condition indicating anti-cooperative execution behavior. Upon sensing the rescheduling condition, a scheduler reschedules at least one of the threads such that the first and second threads no longer execute in the same functional processor group at the same time.

Examples of anti-competitive execution behavior include: use by the first thread of the internal processor group resource causing a denial of use of the resource by the second thread above a minimum acceptable level; triggering more than a threshold number of cache flushes or misses, triggering more than a threshold number of pipeline flushes. etc.

Rescheduling may be triggered according to rules programmed into the schedule, according to user-input parameters, or both, or disabled altogether. For example, the scheduler may input at least one user-specified thread performance requirement and then estimating run-time thread execution performance relative to the performance requirement as a function of an observable condition (for example, performance counters). One measure of anti-cooperative execution behavior will then be violation of the user-specified thread performance requirement.

According to another optional aspect of the invention, the scheduler may input user designation of the first thread as being un-coschedulable with the second thread, in which such user designation is the rescheduling condition. Alternatively, it could input at least one user-provided execution guarantee for a designated one of the threads, in which the rescheduling condition is violation of the guarantee; upon violation of the guarantee, the scheduler then reschedules at least one of the coscheduled threads to ensure that the guarantee is met for the designated thread.

One embodiment of the invention is in a computer system with at least two functional processor groups (such as a multi-threaded processor package or a set or partnered multi-core processors) each having at least two processors (logical or physical, depending on the type of group). One rescheduling decision may then be allowing continued execution of the second thread, and rescheduling execution of the first thread on a processor in a different functional processor group. The first and second threads can then continue to execute simultaneously but in different functional processor groups.

As an example of an expansion of this decision, given four threads executing simultaneously in pairs on the two different processor groups, in which the first and second threads are initially scheduled in a first one of the processor groups and at least a third and a fourth thread are running in a second functional processor group, the scheduler according to the invention can implement a rescheduling decision such that it threads are all running simultaneously but the first and second threads are running in different functional processor groups and the third and fourth threads are also running in different functional processor groups.

In one advantageous embodiment of the invention, the threads originate in at least one virtual machine, in which case the threads may be virtual CPUs. The virtual CPUs may themselves be virtualized logical processors within virtualized, functional processor groups.

The process of rescheduling a thread may include putting the processor on which it was running into a halted state, preempting the thread that is running on that processor and scheduling a different thread to run on that processor. In computers in which the processors in the functional processor group support a hardware thread priority, rescheduling a thread may alternatively comprise changing its priority relative to the priorities of coschedulable threads.

DETAILED DESCRIPTION

Figure 1:
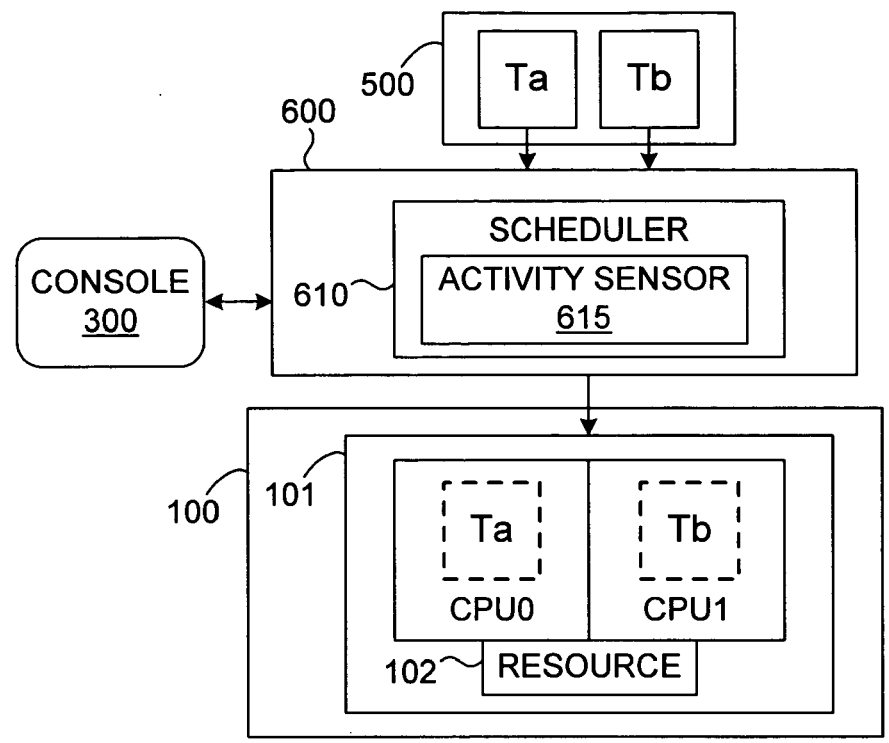
FIG. 1 illustrates the simplest two-thread, two-logical-processor case of the mechanism according to the invention for reducing conflicts for a shared resource in a multi-threaded and/or multi-core computer system.

The main idea of the invention is flexible enforcement of performance isolation using the hardware capabilities of SMT/multi-core processors. The simplest embodiment of the invention is illustrated in FIG. 1: A pair of "partnered" processors CPU0, CPU1 are associated in a functional group 101 such that they share at least one group resource 102 under the control of known hardware mechanisms within the group. As just one example, in a simultaneous multi-threaded (SMT, or, here, simply "multi-threaded") architecture such as Intel Corp.'s Hyper-Threaded Technology, there are two logical processors per package (a type of group), but a hardware mechanism in the processor package itself determines how each thread accesses the trace caches.

A scheduler 610 schedules each of a plurality (two are shown by way of example) of logically cooperating executable threads Ta, Tb for execution on the processors CPU0, CPU1, while an activity sensor 615 within or accessible by the scheduler monitors the behavior of the executing threads. Extensions of this simplified embodiment are described below.

The scheduler 610 will be part of some known intermediate software layer that mediates access to hardware resources. Examples include an operating system, a virtual machine monitor or hypervisor, a kernel in a virtualized computer system, etc., as will be made clearer below. Similarly, the processors CPU0, CPU1 will be part of a larger set of system hardware 100, which will include such components as a disk, memory, power and timing devices, I/O controllers, etc. The other features of system software and hardware are not illustrated or described further here because they are well known and can be assumed to be present in any modern computer system.

One example of a processor group 101 is a multi-thread package, in which the partner processors CPU0, CPU1 are logical processors and the shared resource may be a cache, pipeline, etc. Another example of a group would be a set of multi-core processors. As will become clearer below, the invention is not restricted to any particular number of executable threads, or the manner in which they logically cooperate, and there may be more than one processor group, each of which may have two or more associated processors.

As commonly (but not universally) used, the term "thread" often implies a shared address space. This is not necessary in this invention. Rather, as used here, a thread is simply a body of executable code that is scheduled for execution as a unit. Logical cooperation among threads may be simply that they are multiple threads of a the same software entity, which, for the sake of conciseness, is referred to below as a "task," and which may be, for example, a single process, multiple virtual CPUs in the same virtual machine (see below), etc.

The activity sensor 615 is a software module comprising computer-executable code that either monitors the activity of executing threads with respect to a predetermined activity parameter, or accesses any known mechanism within the system hardware (including within the processor group itself to get a value of the activity parameter. For example, depending on the architecture in which the invention is included, the activity sensor 615 detects any observable condition such as any of the many known hardware performance counters, or includes software performance counters, to determine, for example, the frequency of pipeline flushes, cache flushes or misses, overflow of a resource, requiring too many floating-point operations per predetermined time unit, or any other event indicative of anti-cooperative execution behavior. Note that the activity sensor may operate according to pre-set rules, or by comparing run-time behavior against a user-specified performance threshold or range, or both.

Now assume that the activity sensor 615 detects that thread Tb is behaving "anti-cooperatively," which may be defined in any predetermined sense as any behavior that reduces the ability of one or more other co-scheduled threads to use the shared resource, or that interferes with another thread's attempts to use the resource, such that hardware or software intervention is required. Several examples of anti-cooperative execution behavior have been mentioned above.

Upon detecting anti-cooperative execution behavior, the scheduler 610 may deal with the situation according to predetermined rules programmed into the scheduler, or according to one or more options, depending on the desired implementation of the invention. In one system that incorporates the invention, three alternatives were provided: 1) do nothing, that is, no intervention, such that the anti-cooperative behavior is allowed to continue; 2) follow rules input by the user or administrator, for example via a console 300; or 3) automatically intervene according to predetermined, pre-programmed rules such as when the anti-cooperative behavior causes the sensed or computed value of the activity parameter has exceeded a threshold (for example, too many cache flushes or cache misses) or fallen outside given bounds. Options 2) and 3) may lead to the same type of intervention, as described below, although the conditions that trigger the intervention will be either user-selected or pre-set.

For the time being, the discussion of the invention will focus on the manner in which the scheduler intervenes, since this highlights perhaps the most beneficial aspect of the invention: the scheduler 610 deschedules Tb from CPU1, allowing thread Ta to run alone, or at least without being co-scheduled with the anti-cooperative thread Tb. Alternatively, if Tb is more important in any sense, such as if the user designates it as a higher priority thread, then the scheduler 610 could instead deschedule Ta.

Figure 2:
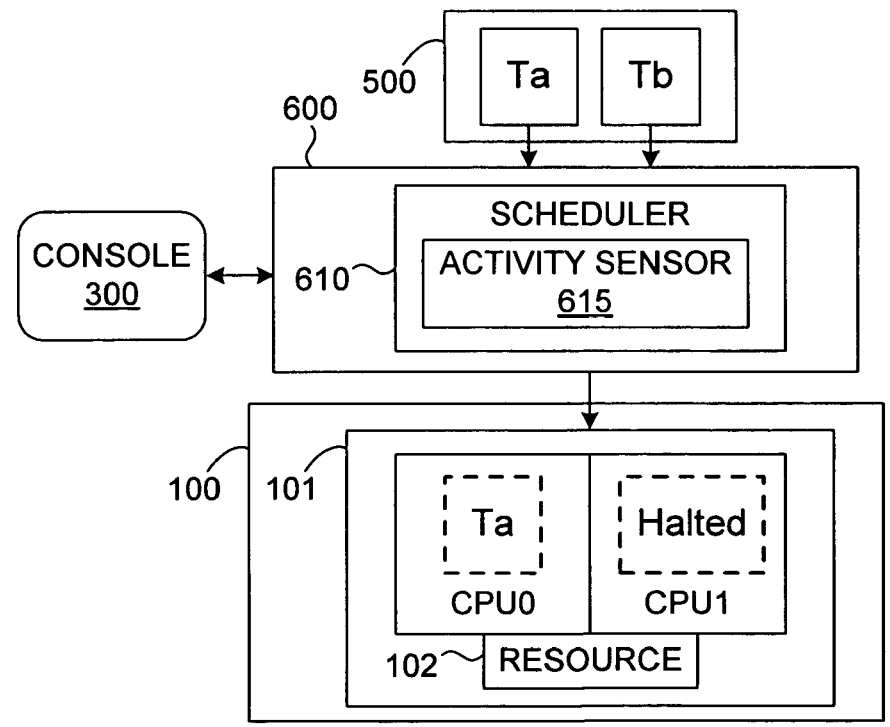
FIG. 2 illustrates the mechanism according to the invention for descheduling one thread running on a package where anti-cooperative execution behavior is detected.

The effect of this is illustrated in FIG. 2: The processor group 101 is effectively converted into a single-processor configuration, in which it will operate as almost any other non-multi-threaded processor. Threads Ta and Tb can then be scheduled to execute separately. Although this will mean that thread Tb will have to wait, it may actually increase overall execution progress, since thread Ta will be able to execute with full access to the shared resource, without repeated wasted processor cycles needed to reconstruct it. Notice, however, a difference in the approach according to the invention relative to the prior art: Upon detecting anti-cooperative behavior, rather than just adjusting the time allotted to the offending thread, the invention makes use of the features of the multi-threaded processor architecture itself to prevent a partial or total denial of service.

Additionally, whereas Grunwald's proposals involve penalizing the anti-cooperative thread, this invention does not, but rather simply changes co-scheduling to reduced-processor scheduling (for example, from dual to single, or, more generally, from k processors to k−1), or changes which processor at least one of the threads executes on. A further distinction between known time-slicing techniques and the invention is that time-slicing implements only coarse-grained interleaving of software threads (thousands or millions of instructions may execute before switching threads), while the invention implements not only coarse- but also fine-grained interleaving of software threads such that the pipeline may be processing instructions from both threads simultaneously. Moreover, unlike Snavely's time-slicing proposals, the invention directly attempts to determine anti-cooperative behavior, and does so at run-time, as threads are actually running together to do "real" work.

Figure 3:
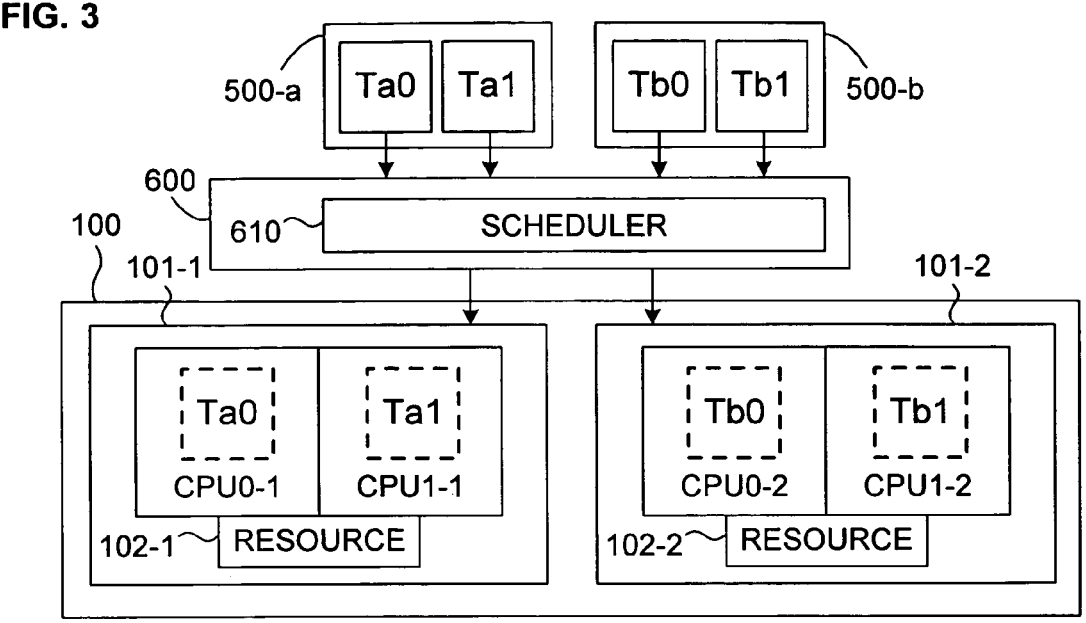
FIG. 3 illustrates a normal operating condition in a multi-threaded or multi-core architect, with two pairs of executable threads each running on respective logical processors in a respective processor group.

FIG. 3 illustrates a configuration of the invention in which two or more tasks 500-a, 500-b (only two are shown for simplicity), each having more than one thread Ta0, Ta1, Tb0, Tb1 (again, only two per task are shown for simplicity) run via the intermediate software layer(s) 600 and are scheduled for execution on any of a plurality of functional processor groups 101-1, 101-2, each of which includes two or more associated physical or logical processors CPU0-1, CPU1-1, CPU0-2, CPU1-2 which share, within each group, a respective resource 102-1, 102-2. It is not necessary to the invention for the number of threads to be the same in each task, or for the number of processors to be the same in each group, or for the number of threads in any task to be the same as the number of processor groups or number of processors in any given group. All that is necessary is that the scheduler or some analogous component that performs operations according to the invention to be able to schedule a particular thread on a particular processor (or processor group, if mechanisms within the group assign processors to submitted threads).

FIG. 3 illustrates the "normal," cooperative multi-threaded situation, in which two threads are running on each processor group, sharing the respective resources. Now if a single thread is detected as being anti-cooperative, the scheduler 610 can deal with this in the same manner as described above for FIGS. 1 and 2, allowing the threads in the other processor group to continue execution as normal.

For the sake of clarity, in FIGS. 3-6, only the various processor groups are shown. The other hardware and software components of the system may be assumed.

Figure 4:
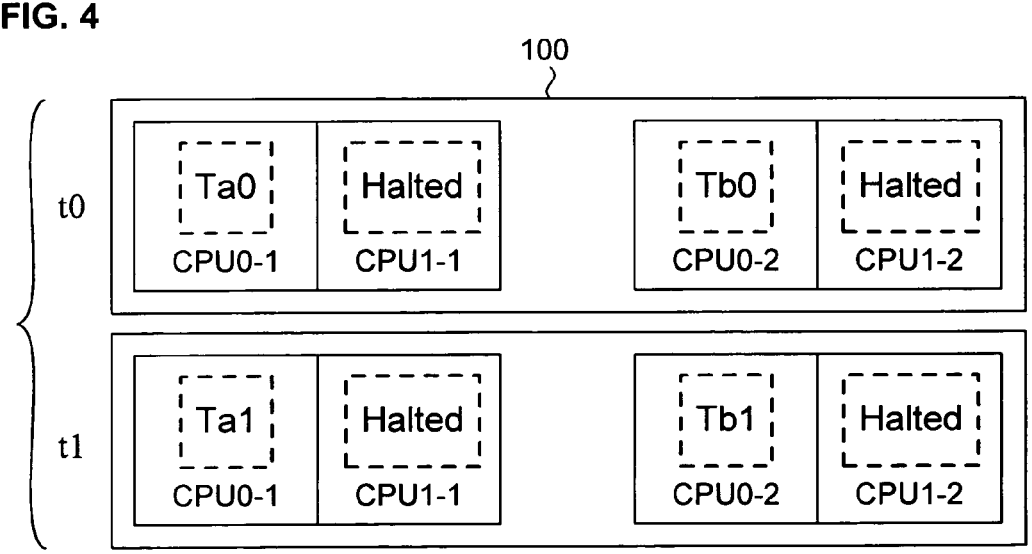
FIG. 4 illustrates one scheduling option at two different times in the case where one thread in each of two packages in FIG. 3 is found to display anti-cooperative behavior.

Assume, however, that a thread in each group (for example, Ta1 and Tb1) is detected as being anti-cooperative. FIG. 4 illustrates one way for the scheduler 610 to allow the other threads Ta0 and Tb0 to proceed, namely, to deschedule Ta1 and Tb1 at time t0. Threads Ta1 and Tb1 can then be rescheduled later, at a time t1, when Ta0 and Tb0 have completed. Threads Ta1 and Tb1 do not have to be rescheduled at the same time, however. The procedure illustrated in FIG. 4 can be considered as a "per group" sharing option inasmuch as the same processor group remains dedicated to the associated threads (Ta0 and Ta1, and Tb0 and Tb1), which execute in the same processor group in which they were originally scheduled.

Figure 5:
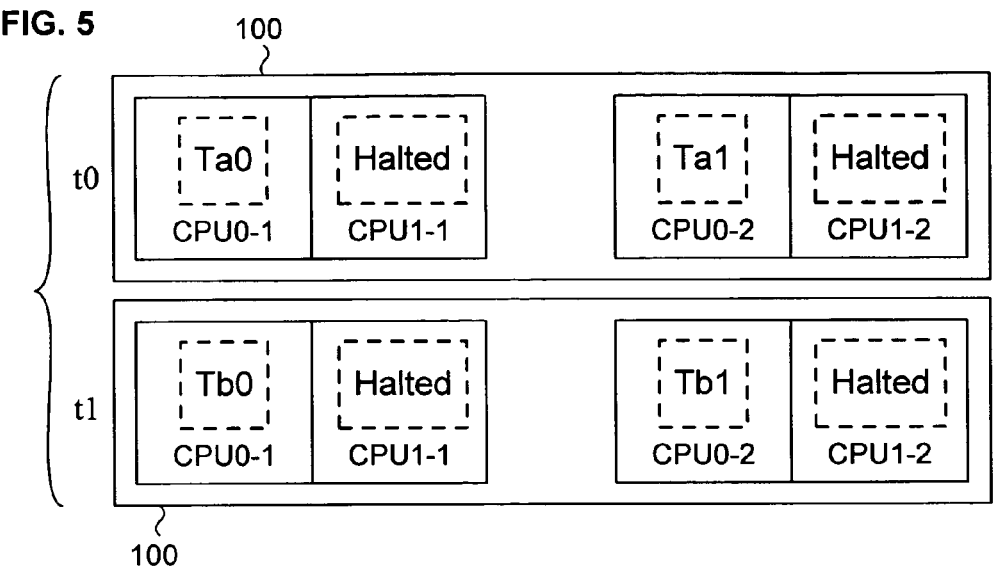
FIG. 5 illustrates an alternative scheduling option to the one shown in FIG. 4, namely, a time-shared scheduling that keeps previously co-scheduled threads within the same processor group.

FIG. 5 illustrates a different rescheduling option, which may be called a "time shared" scheduling option in that the threads of one task (Ta0 and Ta1, for example) are executed simultaneously, but are isolated from one another by being scheduled onto different groups, which then operate as single- or at least reduced-processor groups. The threads of the other task (here, Tb0 and Tb1), are then rescheduled to run afterwards. The decision as to which task's threads are to be given priority may be implemented in any desired manner: Either the task that contained the anti-cooperative thread could be "punished" by having to wait, or its threads could be scheduled to run immediately, with the other, cooperative threads running afterwards.

Figure 6:
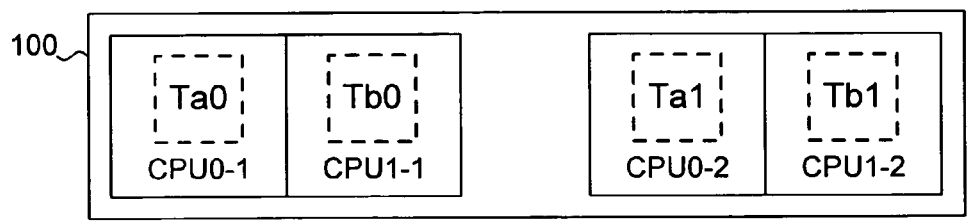
FIG. 6 illustrates yet another alternative scheduling option to the one shown in FIG. 4, namely, one in which all executing threads continue to execute simultaneously, but in which previously co-scheduled threads are rescheduled to run on different processor groups.

Assume that two threads are known or found not to cooperate well with each other, but would not as likely degrade the execution of threads of other tasks. Alternatively, assume that it is desired for any reason to ensure that two threads execute in isolation from one another. FIG. 6 illustrates a scheduling option that handles both these situations: Rather than running the threads on the same processor group, the threads are "cross-scheduled," that is, both processors in each group are working, but each processor group is handling one thread from each previously coscheduled pair.

In this description of the various embodiments of the invention, it is stated that a processor (or, more correctly, the thread running on that processor) may be rescheduled. Depending on how the scheduler chooses to deal with an anti-cooperative thread, this will mean that some thread (either the anti-cooperative thread or one of its thread "victims") running in the same logical processor group (such as package or multi-core processor set) is preempted and that either another "working" thread (Ta0, Tb1, etc.) is scheduled to run on that processor, or that an idle thread is. As mentioned above, scheduling an idle thread on a processor effectively puts it into a "halt" state; for purposes of understanding this invention, however, the term "halt" should not be limited to the sense or particular semantics of the HLT instruction used in most Intel processors, in particular, those with the x86 architecture.

In processor architectures that support a "hardware thread priority," another way to reschedule a thread would be to change the relative priorities of running threads so that a given processor will execute the anti-cooperative thread much less frequently. Note that this option will generally enforce performance isolation less strictly. Skilled programmers will be able to adapt the notion of rescheduling as described here to the needs of a given architecture.

As mentioned above, the software entities (tasks) in which the various threads originate may be of any type. The invention has been found to be particularly advantageous, however, in virtualized computers running on a multi-threaded hardware architecture. An example of the invention in this context will now be described. In addition to providing a concrete example of the invention, this will also show how the invention can be generalized, as well as several specific features that improve performance and that can be used in other embodiments of the invention as well.

The advantages of virtual machine technology have become widely recognized. Among these advantages is the ability to run multiple virtual machines on a single host platform. This makes better use of the capacity of the hardware, while still ensuring that each user enjoys the features of a "complete," isolated computer. Depending on how it is implemented, virtualization also provides greater security since it can isolate potentially unstable or unsafe software so that it cannot adversely affect the hardware state or system files required for running the physical (as opposed to virtual) hardware.

As is well known in the field of computer science, a virtual machine (VM) is a software abstraction—a "virtualization"—of an actual physical computer system. A virtual machine is installed on a "host," such as the hardware platform 100.

Figure 7:
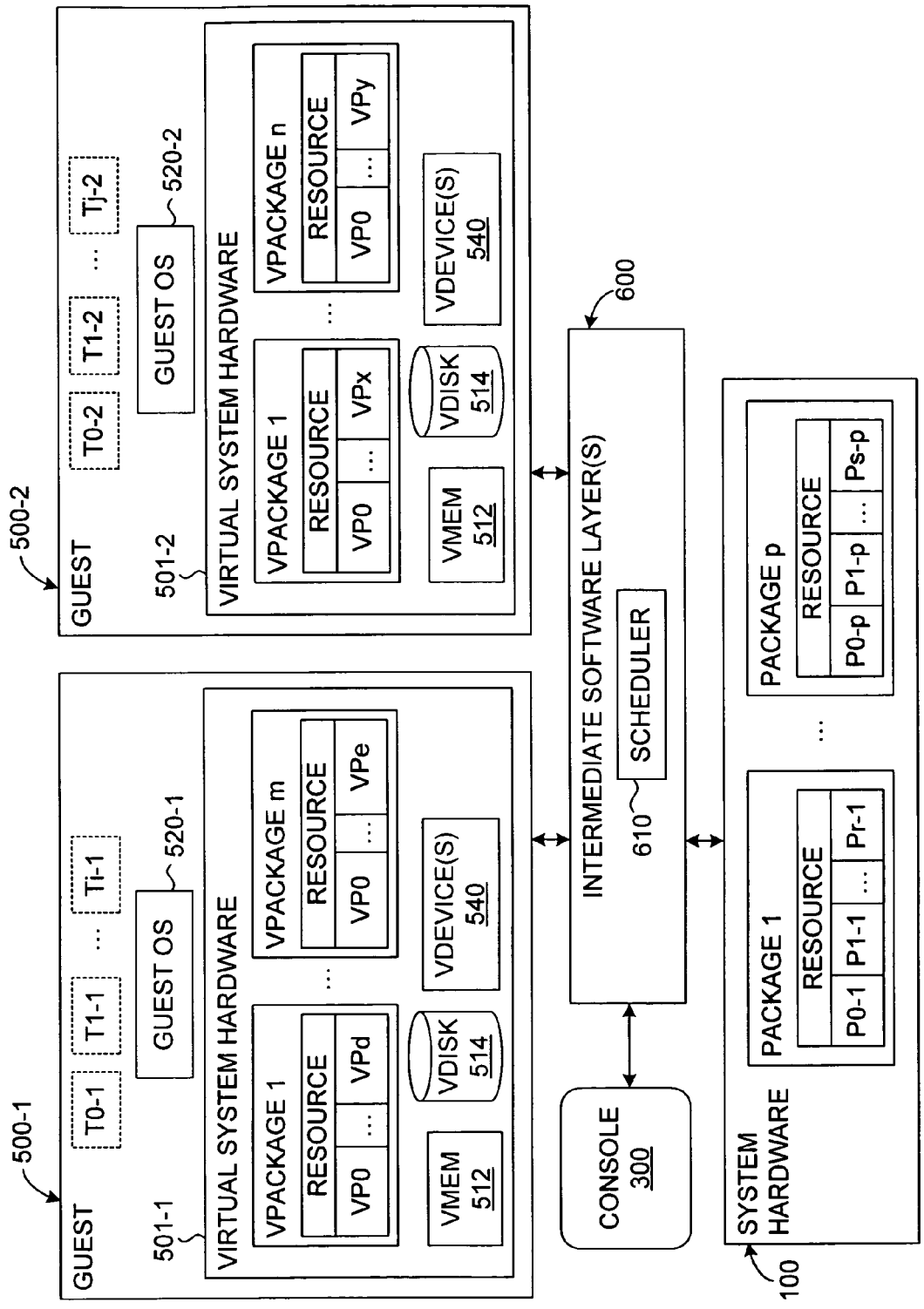
FIG. 7 illustrates, on the one hand, a generalized embodiment of the invention, in which one or more guests, each having one or more multi-threaded or multi-core virtual processors, are scheduled using the invention to execute on a hardware platform that also has one or more processor groups, each containing one or more logical (in the multi-threaded case) or partnered physical (in the multi-core case) processors.

See FIG. 7, which illustrates implementation of the scheduler 610 according to the invention in a virtualized computer system, in which each task whose threads are scheduled is shown as a "guest," which, in the illustrated embodiment, is assumed by way of example to be a virtual machine. Two guests 500-1, 500-2 are shown for the sake of simplicity, although any number may be included, including only one.

Each VM will typically have both virtual system hardware 501-1, 501-2 and guest system software, including or consisting of a guest operating system 520-1, 520-2, which has the typical included and associated software such as drivers as needed. The virtual system hardware typically includes virtual system memory 512, at least one virtual disk 514, and one or more virtual devices 540. Note that a disk—virtual or physical—is also a "device," but is usually considered separately because of its important role. All of the virtual hardware components of the VM may be implemented in software using known techniques to emulate the corresponding physical components.

In the illustrated embodiment, each VM 500-1, 500-2 itself has a virtualized, multi-threaded processor architecture. In fact, in the configuration shown in FIG. 7, each guest has a plurality of virtual processor packages (or, more generally, groups), each of which has a different number of logical processors. Thus, VM 500-1 has m virtual processor packages VPACKAGE 1-$m$, where VPACKAGE 1 has logical processors VP0-VPd; where VPACKAGE m has logical processors VP0-VPe; and VM 500-2 has n virtual processor packages VPACKAGE 1-$n$, VPACKAGE 1 has x logical processors VP0-VPx; and VPACKAGE n has logical processors VP0-VPy. In VM 500-1, i threads T0-1 to Ti-1 are shown as being ready and in VM 500-2, j threads T0-2 to Tj-2 are shown as being ready.

As for the illustrated system hardware 100, p physical processor packages PACKAGE 1-$p$ are shown, where PACKAGE 1 has logical processors P0-1 to P0-$r$; PACKAGE p has logical processors P0-$p$ to Ps-p, and so on. As mentioned above, these groups of processors may also be multi-core instead of multi-threaded.

If a VM is properly designed, then even though applications running within the VM are running indirectly, that is, via its respective guest OS and virtual processor(s), it will act just as it would if run on a "real" computer, except for a decrease in running speed that will be noticeable only in exceptionally time-critical applications. Executable files will be accessed by the guest OS from the virtual disk or virtual memory, which will simply be portions of the actual physical disk or memory allocated to that VM. Once an application is installed within the VM, the guest OS retrieves files from the virtual disk just as if they had been pre-stored as the result of a conventional installation of the application. The design and operation of virtual machines are well known in the field of computer science.

Some interface is usually required between a VM and the underlying host platform 100 (in particular, the hardware CPU(s)), which is responsible for actually executing VM-issued instructions and transferring data to and from the hardware memory and storage devices. A common term for this interface is a "virtual machine monitor" (VMM), which will be included as one of the intermediate software layers but is not labeled specifically in the figures because its presence can be assumed, or because it may be the intermediate software layer 600 that actually includes the scheduler (depending in the virtualized configuration, as described below). A VMM is usually a software component that runs directly on top of a host, or directly on the hardware, and virtualizes at least some of the resources of the physical host machine so as to export some hardware interface to the VM.

The various virtualized hardware components in the VM, such as the virtualized processors, the virtual memory, the virtual disk, and the virtual device(s) are shown as being part of each respective VM 500-1, 500-2 for the sake of conceptual simplicity—in actual implementations these "components" are usually constructs or emulations exposed to the VM by its respective VMM, for example, as emulators. One advantage of such an arrangement is that the VMM may be set up to expose "generic" devices, which facilitate VM migration and hardware platform-independence.

In fully virtualized systems, the guest OS cannot determine the presence of the VMM and does not access hardware devices directly. One advantage of full virtualization is that the guest OS may then often simply be a copy of a conventional operating system. Another advantage is that the system provides complete isolation of a VM from other software entities in the system (in particular, from other VMs) if desired. Because such a VM (and thus the user of applications running in the VM) cannot usually detect the presence of the VMM, the VMM and the VM may be viewed as together forming a single virtual computer.

In contrast, the guest OS in a so-called "para-virtualized" system is modified to support virtualization, such that it not only has an explicit interface to the VMM, but is sometimes also allowed to access at least one hardware resource directly. In short, virtualization transparency is sacrificed to gain speed. In such para-virtualized systems, the VMM is sometimes referred to as a "hypervisor."

This invention may be used in both fully virtualized and para-virtualized computer systems. Indeed, virtualization is not a prerequisite for this invention at all, but rather the software mechanisms that implement the method according to the invention may be incorporated into system-level software even in conventional, non-virtualized systems.

In addition to the distinction between full and partial (para-) virtualization, two arrangements of intermediate system-level software layer(s) are in general use—a "hosted" configuration, and a non-hosted configuration. In a hosted virtualized computer system, an existing, general-purpose operating system forms a "host" OS that is used to perform certain I/O operations, alongside and sometimes at the request of the VMM. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In a non-hosted virtualized computer system, a kernel customized to support virtual computers takes the place of and performs the conventional functions of the host OS, such that virtual computers run on the kernel. In addition to the various VM/VMMs, the kernel also handles any other applications running on the kernel that can be separately scheduled, as well as any temporary "console" operating system, if included, used for booting the system as a whole and for enabling certain user interactions with the kernel. Thus, in a non-hosted virtualized computer system, the kernel will be the primary if not sole intermediate software layer 600.

Compared with a system in which VMMs run directly on the hardware platform, use of a kernel offers improved performance because it can be co-developed with the VMMs and be optimized for the characteristics of a workload consisting mostly of virtualized computers. Moreover, a kernel can also be optimized for I/O operations and it allows services to extend across multiple VMs (for example, for resource management). The ESX Server product of VMware, Inc., is an example of a non-hosted virtualized computer system.

Various options for scheduling different threads on the logical processors of different packages are described above with reference to FIGS. 1-6. All of these options may be made available in the more generalized system shown in FIG. 7, such that logical processors are halted as needed, or anti-cooperative threads can be rescheduled on different packages, upon detection of anti-cooperative behavior on the part of any running thread.

Note that, in a system with guests that have virtual processors, the virtual processors themselves are typically the threads that are scheduled to run on the underlying hardware processors. Separate threads T0-1 to Ti-1 and T0-2 to Tj-2 are shown in FIG. 7 simply so that this Figure will be easier to compare with the previous figures.

Certain specifics of an implementation of the invention in a non-hosted virtualized computer system—specifically, a version of VMware's ESX Server product—will now be described by way of example. In this example, it is assumed that the processor architecture is Intel Corp.'s Hyper-Threading Technology architecture and that the shared resource in question is a trace cache. To the extent they are needed at all, modifications to the described embodiment to accommodate other architectures (such as multi-core, with more than two logical processors per package, etc.) and shared resources will be within the skill of experienced designers of system-level software.

To understand the performance implications of Hyper-Threading (HT), it is important to recall that most processor resources are shared between the two executing threads. For instance, the L1, L2 and L3 caches and all functional units (such as the floating point units and arithmetic/logical units) are flexibly shared between the two threads. So, if one thread is using very little cache, the other thread will be able to take advantage of all the unused cache space. However, if both threads demand large amounts of cache, they will compete for the limited capacity likely slow each other down.

By default, HT is preferably enabled during the ESX Server installation process on any hardware that supports the feature. A checkbox is also provided in a Management User Interface to enable or disable HT. Assuming that the user selects multi-threading, the user, for example using the console 300, is preferably also given the option of enabling or disabling this invention. One advantage of the invention is that it requires few other changes to the interface presented to the user—the number of CPUs shown in the Management User Interface will double, and the list of available CPUs for the per VM-only use processors (also known as CPU affinity) will double.

Most systems with Intel Xeon MP processors or Intel Xeon processors with at least 512 KB of cache support HT. However, in order for ESX Server to enable multi-threading, the server BIOS must be properly configured with multi-threading enabled. Skilled systems administrators will know how to configure a BIOS; moreover, the factory default BIOS setup often enables HT.

As mentioned above, an operating system can cause logical processors to enter an architecture-dependent halted state, often within the context of an idle thread. This halted state frees up hardware execution resources to the partner logical processor (the other logical processor on the same package), so that a thread running on the partner logical processor runs effectively like a thread on a non-HT system. The VMware ESX Server preferably uses the halted state aggressively to guarantee full utilization of the system's processing power, even when there are not enough running threads to occupy all logical processors.

ESX Server accounts for CPU time in terms of "package seconds," not logical processor seconds. A VM running on a logical processor that shares a package with another busy logical processor will be charged for half as much as a VM running on a logical processor with its partner halted. In other words, a VM is only "half-charged" when it runs on only half of a package, but fully charged if it has the package to itself. Performance testing has shown this to be the most accurate and understandable way to quantify the impact of HT performance implications. This style of accounting also makes it easier to compare performance between HT and non-HT systems, because CPU time consumed is measured in the same units on both system types.

Because the benefits of HT depend so heavily on the characteristics of the running workload, it is difficult to generalize about the performance impact of HT. Intel suggests that some applications may see performance improvements of up to 30%, but, in practice, these extreme improvements are rare. More typical applications see performance benefits closer to 10%, and a few applications will decrease slightly in performance when run on a multi-threaded system.

When running symmetric multi-processor (SMP) VMs on a system with two physical packages, however, the performance gains may be more substantial. VMware ESX Server preferably coschedules both virtual CPUs in an SMP VM. That is to say, if one virtual CPU in the VM is running, they must both be running or idle. This can lead to a problem of "processor fragmentation" on two-way systems. Consider the case where a uni-processor VM is running and a two-processor VM is ready to run: One physical CPU will be idle, but ESX Server will not be able to run the SMP VM, because it would need two available physical processors. Thus, a physical CPU may be left idle. This problem may also arise in the more generalized case shown in FIG. 7, in which VMs have more than two virtual packages and/or more than two logical CPUs per virtual package. For example, is one VM has a single two-CPU package and another VM has a single three-CPU package, then the VM with the three-CPU package would need to wait to make any execution progress in known systems.

The above situation would not be a problem for a multi-threaded system. For example, VMware ESX server could dedicate one package (with two logical CPUs) to the SMP VM and another package to the uni-processor VM (running on one logical CPU, with the other halted), thus fully utilizing the system's resources. This increased utilization can lead to substantial performance benefits for realistic workloads with a mix of SMP and uni-processor VMs. In addition to the basic features described above, VMware ESX Server provides a number of improvements and configuration options that advance the state of the art in HT performance and management.

In VMware ESX Server, VMs typically receive CPU time proportional to an allocation of "shares." Even in systems that incorporate the invention, VMware ESX Server's CPU resource controls are preferably tightly integrated with HT accounting: Virtual machines still receive to their share allocation, but are capped by user-specified min and max values, which may be entered, for example, using the console 300. While shares allow relative allocation of resources (so that an administrator can specify one VM should receive twice the resources of another VM, for instance), min and max are absolute guarantees, measured as a percentage of a package's resources. That is, a VM with a min of "75%" and a max of "90%" is guaranteed to get at least 75% of a package's time, but never more than 90%, even if extra idle time is available in the system. These limits may be incorporated into the scheduler's 610 scheduling routine in any normal manner.

To achieve this level of fairness, ESX Server dynamically expands a high-priority VM to use a full package, by rescheduling its partner logical processor to run an idle thread (which, for example, may execute the HLT instruction), even if other VMs are currently runnable in the system. This does not waste resources, but simply redirects them to the high priority VM, so that it can receive up to a full physical package (or two full physical packages for an SMP VM with two virtual CPUs), depending on the administrator-specified configuration. This feature differentiates ESX Server from commodity operating systems, which attempt to keep all logical CPUs busy, even if doing so hurts the progress of a high-priority thread. Expansion and contraction are preferably fully dynamic and transparent to the administrator.

Another user choice made possible by the invention is that the user may specify not only a percentage of a package's time, but may also indicate to the scheduler 610, via the console 300 or otherwise, such as with settings specified in an associated configuration file or other user-specified configuration state, that a particular thread is known to be anti-cooperative and should not be co-scheduled with other threads. The scheduler 610 will then not need to bother detecting whether the indicated thread(s) must be isolated since this will already have been decided. In addition to saving the scheduler from having to make the decision about quarantining, user-manual control has an additional benefit: The user can take advantage of the invention to guard against attacks that are either impossible to detect with the activity sensor or that were not known at the time of the scheduler's design.

While HT Technology can provide a useful performance boost for many workloads, it also increases the possibility of performance interference between two applications running simultaneously. For instance, as discussed earlier, an application with extremely poor cache performance may lead to performance problems for another application running on the same physical package.

On a commodity operating system, when an application is observed to interact poorly with HT Technology, the administrator has little choice but to disable HT on the entire machine. ESX server, however, using the invention, provides an additional level of control for administrators to manage package-sharing settings at the level of the individual VM: Users can select from three choices (called "HT-sharing" settings) for each VM: any sharing, no sharing, or internal sharing only. The default setting, "any," allows the scheduler 610 to schedule virtual CPUs from the designated VM on the same package with any other virtual CPU. This allows the system to exploit HT Technology to its fullest, and it is the best choice for the majority of applications.

The "internal" setting applies only to SMP VMs. It specifies that the two (or more) virtual CPUs (which form schedulable threads) from the VM in question can share a package together, but not with virtual CPUs from any other VM. This contains any HT performance issues within the designated VM, so it can neither affect the performance of other VMs nor be affected by them. ESX Server can still dedicate a full package to each virtual CPU in the VM, however, if resource constraints and the system activity load permit it. For applications that are quite sensitive to performance variations (such as streaming media servers), this setting may provide the best balance between HT utilization and performance isolation.

Finally, the "no sharing" setting guarantees that each virtual CPU will always run on a full package, with the partner logical CPU halted. This setting can be chosen to maximize the VM's isolation, and it is particularly appropriate for virtual machines running applications that are known to perform poorly on multi-threaded systems. Note that the "no sharing" option causes the scheduler to implement time-slicing (coarse-grained interleaving) whereas the "internal" and "any" options both lead to fine-grained interleaving.

As mentioned above, Grunwald showed a particularly malicious application could degrade the performance of another workload running on the same physical package by as much as 90% through, for example, the use of self-modifying code in a tight loop. Although the inventors have not yet observed such an attack in the field, the invention as incorporated into ESX Server includes special optimizations to ensure that a rogue thread in one VM can not severely degrade the performance of another VM: The scheduler 610 in the ESX Server kernel accesses low-level hardware counters to observe the frequency of events that may indicate potentially anti-cooperative behavior.

If the number of harmful events observed in a given time period for a certain VM is too high, the system automatically "quarantines" that VM by placing it into the "no sharing" state (or, alternatively, the internal state), as described above. This setting protects other VMs from the potential denial of service attack, but does not excessively degrade performance for the misbehaving VM, as it loses only the added benefit of HT. If the degree of anti-cooperative behavior eventually drops below a specified threshold, the VM will be released from the quarantined state and allowed to run on a package along with other threads.

Particularly for network-intensive workloads, context switches due to interrupts can be a major source of overhead. To address this problem, VMware ESX Server 2.1 has tightly integrated the interrupt-steering code with the HT-aware scheduler 610. ESX Server minimizes unnecessary context switches by preferentially directing interrupts to idling logical processors, which are already waiting in a kernel mode, that is, are available to the kernel. Similarly, when the scheduler has to decide which logical processor of a package should begin running a thread, it preferentially chooses the logical processor with the lower interrupt load, which the scheduler 610 may determine using known techniques In many systems, device drivers handle asynchronous events, such as interrupts or "bottom halves," which are snippets of code (a form of thread) used to aid in the processing of interrupts. The manual/automatic quarantining approach according to the invention could also apply to interrupts, such that an interrupt is not handled by a logical CPU on the same package as a "no sharing" thread; furthermore, anti-cooperative device drivers could have their interrupts directed to processors that are not running time-critical threads.

We claim:

1. A method for controlling execution of a plurality of threads by a processing system that has at least two processors in at least one functional processor group, in which threads coscheduled for execution on the processors share an internal processor group resource, the method comprising:

when at least a first and a second thread are coscheduled for execution on the processors of the functional processor group, sensing during run time the presence of a rescheduling condition indicating that either the first thread or the second thread is exhibiting anti-cooperative execution behavior towards the other coscheduled thread, wherein anti-cooperative execution behavior comprises any behavior that reduces or interferes with the ability of another coscheduled thread to use the shared internal processor group resource at a predetermined level;

inputting at least one user-specified thread performance requirement;

estimating run-time thread execution performance relative to the performance requirement as a function of an observable condition, in which the anti-cooperative execution behavior is violation of the user-specified thread performance requirement; and upon sensing the rescheduling condition, rescheduling at least one of the threads such that the first and second threads no longer execute in the same functional processor group at the same time.

2. A method as in claim 1, in which the anti-cooperative execution behavior is use by the first thread of the internal processor group resource causing a denial of use of the resource by the second thread above a minimum acceptable level.

3. A method as in claim 2, in which the anti-cooperative execution behavior is triggering more than a threshold number of cache flushes.

4. A method as in claim 2, in which the anti-cooperative execution behavior is triggering more than a threshold number of cache misses.

5. A method as in claim 2, in which the anti-cooperative execution behavior is triggering more than a threshold number of pipeline flushes.

6. A method as in claim 1, further comprising inputting user designation of the first thread as being un-coschedulable with the second thread, in which such user designation is the rescheduling condition.

7. A method as in claim 1, further comprising:

inputting at least one user-provided execution guarantee for a designated one of the threads, in which the rescheduling condition is violation of the guarantee; and upon violation of the guarantee, rescheduling at least one of the coscheduled threads to ensure that the guarantee is met for the designated thread.

8. In a computer system with at least two functional processor groups each having at least two processors, the method of claim 1, further comprising allowing continued execution of the second thread, and rescheduling execution of the first thread on a processor in a different functional processor group, whereby the first and second threads continue to execute simultaneously but in different functional processor groups.

9. A method as in claim 8, in which the first and second threads are initially scheduled in a first one of the processor groups and at least a third and a fourth thread are running in a second functional processor group, further comprising:

co-scheduling the second and third threads and co-scheduling the first and fourth threads such that the first, second, third and fourth threads are all running simultaneously but the first and second threads are running in different functional processor groups and the third and fourth threads are also running in different functional processor groups.

10. A method as in claim 1, in which each functional processor group is a multi-threaded processor and the processors are logical processors.

11. A method as in claim 1, in which each functional processor group is a multi-core processor arrangement and the at least two processors are partnered, physical processors.

12. A method as in claim 1, in which the threads originate in at least one virtual machine.

13. A method as in claim 12, in which the threads are virtual CPUs.

14. A method as in claim 13, in which the virtual CPUs themselves are virtualized logical processors within virtualized, functional processor groups.

15. A method as in claim 1, in which the step of rescheduling a thread comprises putting the processor on which it was running into a halted state.

16. A method as in claim 1, in which the step of rescheduling a thread comprises preempting the thread that is running on that processor and scheduling a different thread to run on that processor.

17. In a computer system in which the processors in the functional processor group support a hardware thread priority, the method as in claim 1, in which the step of rescheduling a thread comprises changing its priority relative to the priorities of coschedulable threads.

18. A method as in claim 1, wherein the thread performance requirement is that neither the first thread nor the second thread can reduce the other thread's ability to use the shared resource by more than a threshold value.

19. A method as in claim 1, wherein the thread performance requirement is that the first thread and the second thread be able to use the shared resource according to a specified allocation of shares of the shared resource.

20. A method for controlling execution of a plurality of threads by a processing system that has at least two processors in at least one functional processor group, in which threads coscheduled for execution on the processors share an internal processor group resource, the method comprising:

when at least a first and a second thread are coscheduled for execution on the processors of the functional processor group, sensing during run time the presence of a rescheduling condition indicating that either the first thread or the second thread is exhibiting anti-cooperative execution behavior towards the other coscheduled thread, wherein anti-cooperative execution behavior comprises any behavior that reduces or interferes with the ability of another coscheduled thread to use the shared internal processor group resource;

inputting at least one user-specified thread performance requirement;

estimating run-time thread execution performance relative to the performance requirement as a function of an observable condition, in which the anti-cooperative execution behavior is violation of the user-specified thread performance requirement; and upon sensing the rescheduling condition, rescheduling at least one of the threads such that the first and second threads no longer execute in the same functional processor group at the same time;

in which:

the anti-cooperative execution behavior is use by the first thread of the internal processor group resource causing a denial of use of the resource by the second thread above a minimum acceptable level;

each functional processor group is a multi-threaded processor and the processors are logical processors; and the threads are virtual CPUs in a virtual machine.

21. A system for controlling execution of a plurality of threads by a processing system that has at least two processors in at least one functional processor group, in which threads coscheduled for execution on the processors share an internal processor group resource, the system comprising:

a user input console for inputting at least one user-specified thread performance requirement; and a scheduling module embodied in a computer readable storage medium comprising computer-executable code for sensing, during run time, when at least a first and a second thread are cosheduled for execution on the processors of the functional processor group, the presence of a rescheduling condition indicating that either the first thread or the second thread is exhibiting anti-cooperative execution behavior towards the other coscheduled thread, wherein anti-cooperative execution behavior comprises any behavior that reduces or interferes with the ability of another coscheduled thread to use the shared internal processor group resource at a predetermined level; and upon sensing the rescheduling condition, for rescheduling at least one of the threads such that the first and second threads no longer execute in the same functional processor group at the same time, in which the scheduling module is further provided for estimating run-time thread execution performance relative to the performance requirement as a function of an observable condition, in which the anti-cooperative execution behavior is violation of the user-specified thread performance requirement.

22. A system as in claim 21, in which the anti-cooperative execution behavior is use by the first thread of the internal processor group resource causing a denial of use of the resource by the second thread above a minimum acceptable level.

23. A system as in claim 22, in which internal processor group resource is a cache and the anti-cooperative execution behavior is triggering more than a threshold number of cache misses.

24. A system as in claim 22, in which internal processor group resource is a in pipeline and the anti-cooperative execution behavior is triggering more than a threshold number of pipeline flushes.

25. A system as in claim 21, in which internal processor group resource is a cache and the anti-cooperative execution behavior is triggering more than a threshold number of cache flushes.

26. A system as in claim 21, comprising at least two functional processor groups each having at least two processors, the scheduling module being further provided:

for allowing continued execution of the second thread, and for rescheduling execution of the first thread on a processor in a different functional processor group, whereby the first and second threads continue to execute simultaneously but in different functional processor groups.

27. A system as in claim 21, in which each functional processor group is a multi-threaded processor and the processors are logical processors.

28. A system as in claim 21, in which each functional processor group is a multi-core processor arrangement and the at least two processors are partnered, physical processors.

29. A system as in claim 21, further comprising at least one virtual machine, in which the threads originate.

30. A system as in claim 29, in which the threads are virtual CPUs.

31. A system as in claim 30, in which the virtual CPUs themselves are virtualized logical processors within virtualized, functional processor groups.

32. A system as in claim 21, wherein the thread performance requirement is that neither the first thread nor the second thread can reduce the other thread's ability to use the shared resource by more than a threshold value.

33. A system as in claim 21, wherein the thread performance requirement is that the first thread and the second thread be able to use the shared resource according to a specified allocation of shares of the shared resource.

* * * * *